US012696157B2

(12) United States Patent
Kumar et al.

(10) Patent No.: US 12,696,157 B2
(45) Date of Patent: Jul. 28, 2026

(54) METHOD AND APPARATUS FOR ACCESS CONTROL OF UE THROUGH MBSR-UE IN COMMUNICATION SYSTEM

(71) Applicant: SAMSUNG ELECTRONICS CO., LTD., Suwon-si (KR)

(72) Inventors: Lalith Kumar, Bangalore (IN); Aman Agarwal, Bangalore (IN); Avneesh Tiwari, Bangalore (IN); Kailash Kumar Jha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 18/477,400

(22) Filed: Sep. 28, 2023

(65) Prior Publication Data

US 2024/0107407 A1     Mar. 28, 2024

(30) Foreign Application Priority Data

Sep. 28, 2022    (IN) .............................. 202241055722
Sep. 8, 2023    (IN) .............................. 202241055722

(51) Int. Cl.
*H04W 36/08*        (2009.01)
*H04W 36/12*        (2009.01)

(52) U.S. Cl.
CPC ........... *H04W 36/08* (2013.01); *H04W 36/12* (2013.01)

(58) Field of Classification Search
None
See application file for complete search history.

(56) References Cited

U.S. PATENT DOCUMENTS

2025/0240682 A1 *  7/2025  Chandrashekar ...........................
                                                          H04W 36/0085

FOREIGN PATENT DOCUMENTS

| WO | 2021093210 A1 | 5/2021 |
| WO | 2022172822 A1 | 8/2022 |
| WO | 2022185942 A1 | 9/2022 |

OTHER PUBLICATIONS

International Search Report and Written Opinion of the International Searching Authority dated Dec. 28, 2023, in connection with International Application No. PCT/KR2023/015097, 8 pages.
Qualcomm, "Proposal on consolidated requirements for FS_VMR," 3GPP TSG-SA WG1 Meeting #94-e, S1-211502, Electronic Meeting, May 10-20, 2021, 11 pages.

(Continued)

*Primary Examiner* — Suhail Khan

(57)        ABSTRACT

A method for access control of a UE (120) connecting through a Mobile base station relay (MBSR)-UE (122) in a wireless network (1000) by an IAB-Donor gNB (108). The method includes connecting the UE (120) to the IAB-Donor gNB (108) through a first MBSR-UE (122) to receive an emergency service in the wireless network. Further, the method includes determining that the first MBSR-UE (122a) is about to become unavailable to provide the emergency service to the UE (120) in the wireless network. Further, the method includes transmitting a handover request message to the UE (120) to perform an handover procedure to move the UE (120) to a NG-RAN node (104) before the first MBSR-UE (122a) becomes unavailable in the wireless network upon determining that the first MBSR-UE (122a) is about to become unavailable.

15 Claims, 12 Drawing Sheets

(56)         References Cited

OTHER PUBLICATIONS

3GPP TR 23.700-05 V1.0.0 (Sep. 2022) Technical Report; 3rd Generation Partnership Project; Technical Specification Group Services and System Aspects; Study on architecture enhancements for vehicle-mounted relays; (Release 18); 87 pages.

3GPP TS 22.261 V19.0.0 (Sep. 2022) Technical Specification; 3rd Generation Partnership Project; Technical Specification Group Services and System Aspects; Service requirements for the 5G system; Stage 1 (Release 19); 115 pages.

3GPP TS 38.401 V16.10.0 (Sep. 2022) Technical Specification; 3rd Generation Partnership Project; Technical Specification Group Radio Access Network; NG-RAN; Architecture description (Release 16); 80 Pages.

Supplementary European Search Report dated Nov. 20, 2025, in connection with European Patent Application No. 23873245.7, 15 pages.

CATT, "Group Handover in Inter IAB donor-CU," 3GPP TSG-RAN3 Meeting #109-e, E-meeting, Aug. 17-28, 2020, R3204733, 5 pages.

Intel Corporation, "Mobility Enhancement of mobile IAB-node and served UEs" 3GPP TSG RAN WG2 Meeting #119-e, Electronic meeting, Aug. 17-28, 2022, R2-2207121, 10 pages.

\* cited by examiner

Figure 3:
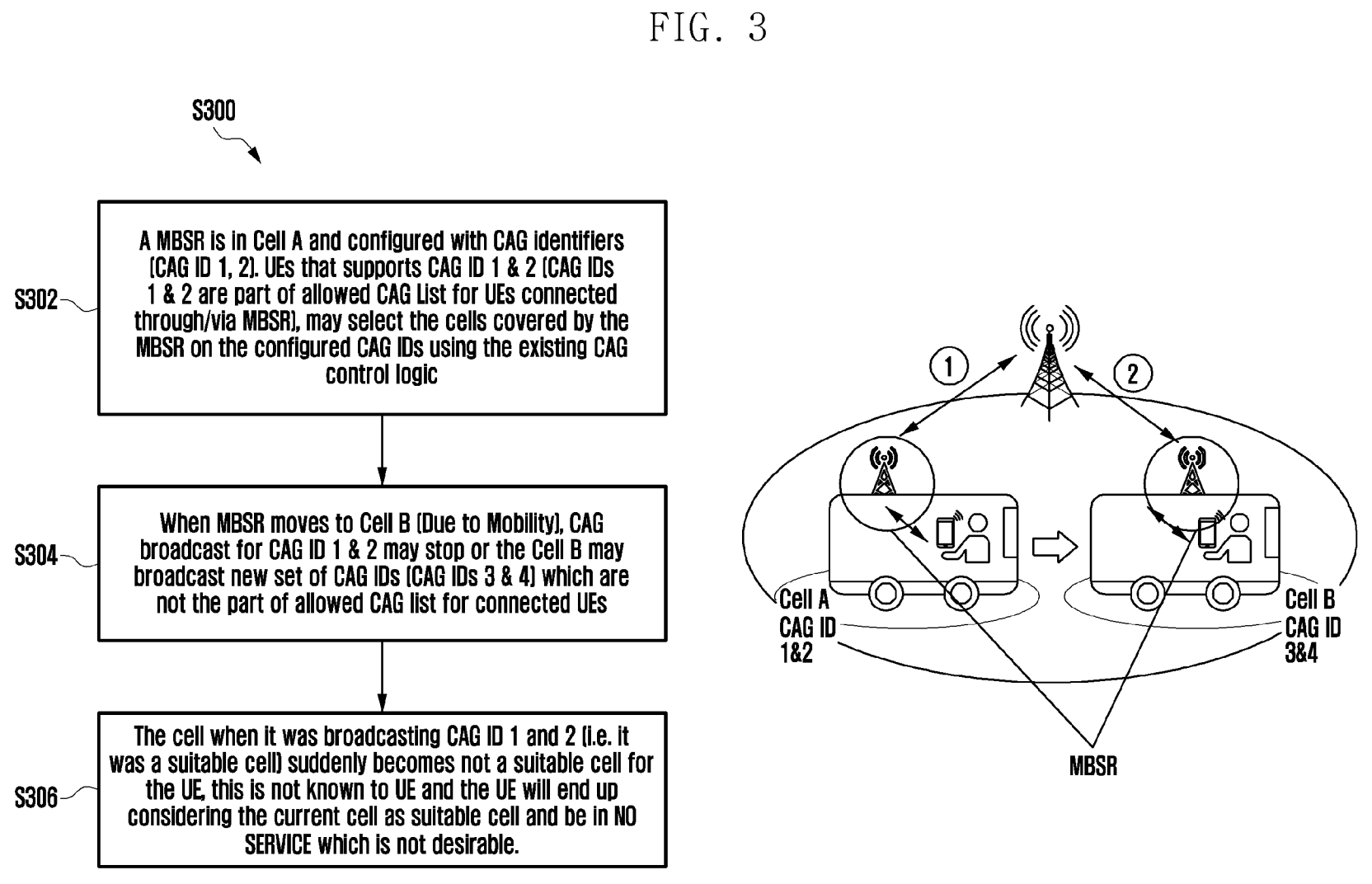

S302
A MBSR is in Cell A and configured with CAG identifiers (CAG ID 1, 2). UEs that supports CAG ID 1 & 2 (CAG IDs 1 & 2 are part of allowed CAG List for UEs connected through/via MBSR), may select the cells covered by the MBSR on the configured CAG IDs using the existing CAG control logic

S304
When MBSR moves to Cell B (Due to Mobility), CAG broadcast for CAG ID 1 & 2 may stop or the Cell B may broadcast new set of CAG IDs (CAG IDs 3 & 4) which are not the part of allowed CAG list for connected UEs

S306
The cell when it was broadcasting CAG ID 1 and 2 (i.e. it was a suitable cell) suddenly becomes not a suitable cell for the UE, this is not known to UE and the UE will end up considering the current cell as suitable cell and be in NO SERVICE which is not desirable.

Cell B
CAG ID
3&4

Cell A
CAG ID
1&2

MBSR

FIG. 6

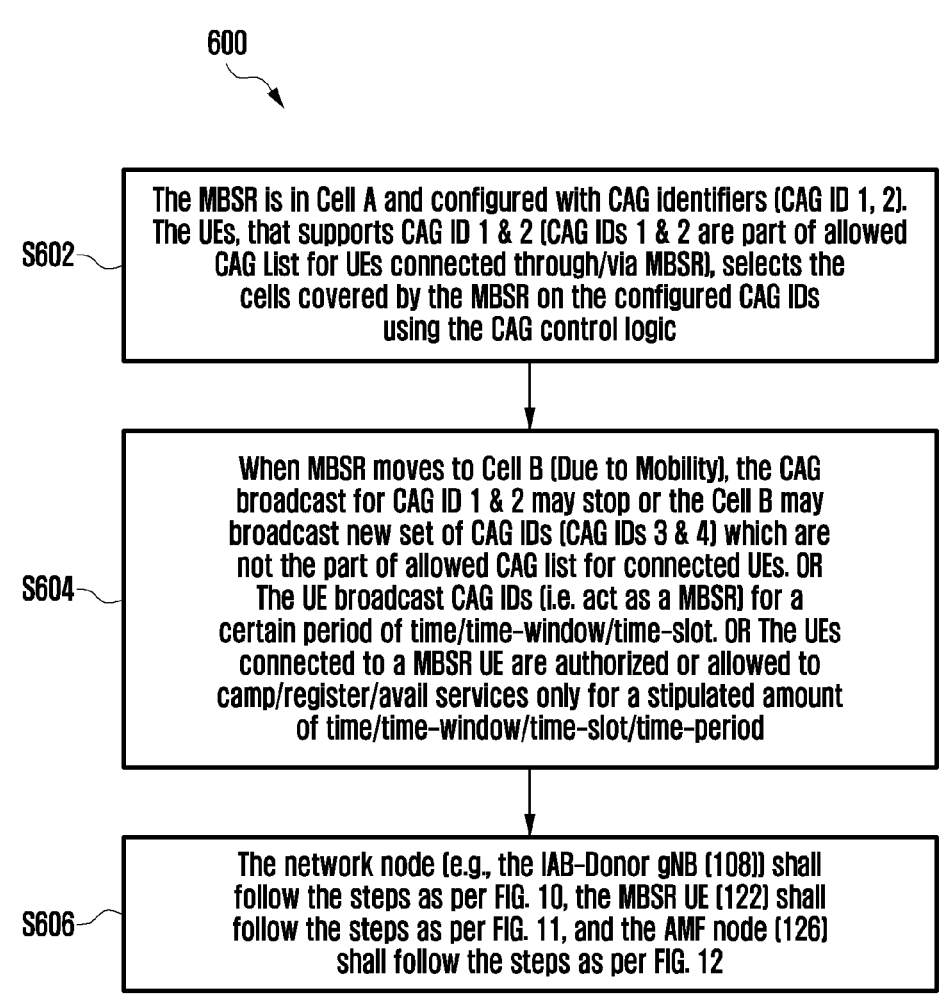

600

S602 — The MBSR is in Cell A and configured with CAG identifiers (CAG ID 1, 2). The UEs, that supports CAG ID 1 & 2 (CAG IDs 1 & 2 are part of allowed CAG List for UEs connected through/via MBSR), selects the cells covered by the MBSR on the configured CAG IDs using the CAG control logic S604 — When MBSR moves to Cell B (Due to Mobility), the CAG broadcast for CAG ID 1 & 2 may stop or the Cell B may broadcast new set of CAG IDs (CAG IDs 3 & 4) which are not the part of allowed CAG list for connected UEs. OR The UE broadcast CAG IDs (i.e. act as a MBSR) for a certain period of time/time-window/time-slot. OR The UEs connected to a MBSR UE are authorized or allowed to camp/register/avail services only for a stipulated amount of time/time-window/time-slot/time-period S606 — The network node (e.g., the IAB-Donor gNB (108)) shall follow the steps as per FIG. 10, the MBSR UE (122) shall follow the steps as per FIG. 11, and the AMF node (126) shall follow the steps as per FIG. 12

FIG. 10

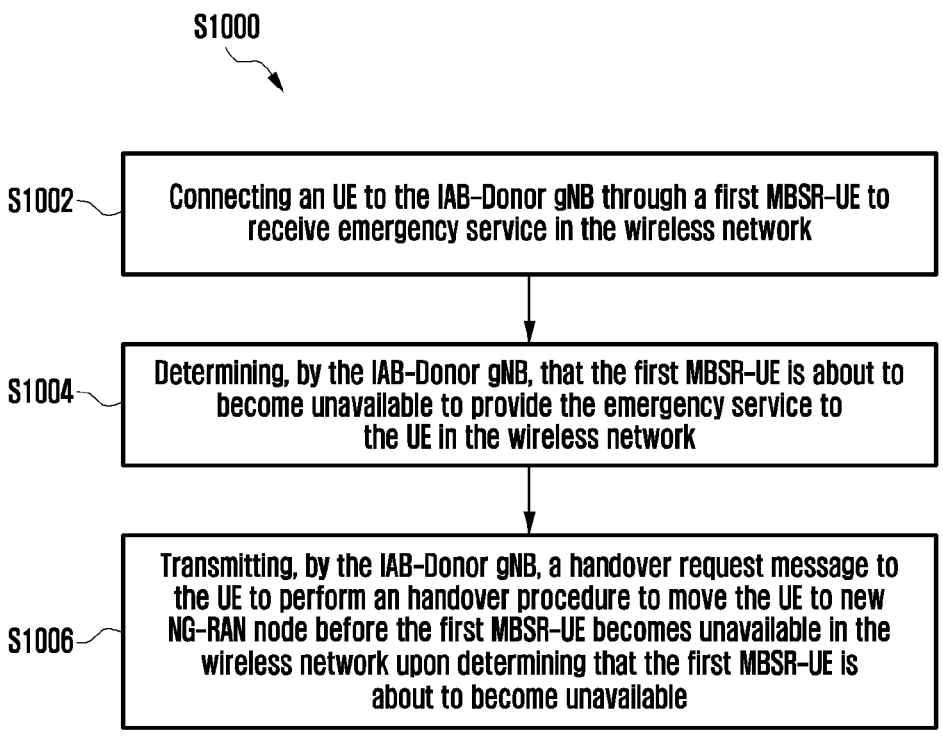

S1000

S1002 — Connecting an UE to the IAB-Donor gNB through a first MBSR-UE to receive emergency service in the wireless network S1004 — Determining, by the IAB-Donor gNB, that the first MBSR-UE is about to become unavailable to provide the emergency service to the UE in the wireless network S1006 — Transmitting, by the IAB-Donor gNB, a handover request message to the UE to perform an handover procedure to move the UE to new NG-RAN node before the first MBSR-UE becomes unavailable in the wireless network upon determining that the first MBSR-UE is about to become unavailable

S1100

METHOD AND APPARATUS FOR ACCESS CONTROL OF UE THROUGH MBSR-UE IN COMMUNICATION SYSTEM

CROSS REFERENCE TO RELATED APPLICATIONS

This application is based on and derives the benefit of Indian Provisional Application No. 202241055722 filed on Sep. 28, 2022, and Indian Non-Provisional Application No. 202241055722 filed on Sep. 8, 2023, the contents of which are incorporated herein by reference.

BACKGROUND

1. Field

The present embodiments relate to wireless communications and systems, and more specifically related to a method and a wireless network of access control of a UE connecting through a MBSR-UE in a wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. When using an IAB architecture, a mobile base station relay (e.g., IAB-node or the like) consists of a gNB-DU and an IAB-UE. The IAB architecture shall be possible to support provisioning and configuration mechanisms to control UEs' selection of and access to the mobile base station relay, e.g. based on geographic or temporary restrictions, etc. A CAG identifies a group of subscribers who are permitted to access one or more CAG cells associated to the CAG. The CAG is used for a public network integrated NPNs to prevent UE(s), which are not allowed to access the NPN via the associated cell(s), from automatically selecting and accessing the associated cell(s).

The terms "mobile base station relay", "IAB-Node", "relay node" and "MBSR" are used interchangeably and have the same meaning in the present disclosure. The terms "Normal UE", "UE NO-MBSR" and "UE (without mobile relay operation)" are used interchangeably and have the same meaning in the present disclosure. The terms "camp" and "register" are used interchangeably and have the same meaning in the present disclosure. The terms "IAB-Donor" and "IAB-Donor gNB" are used interchangeably and have the same meaning in the present disclosure.

The term area as used in the embodiment may refer to any of cell/cell ID, TAC/TAI, PLMN/MCC/MNC, Latitude/longitude, any CAG/CAG identifier or any geographical location/coordinate. The term "UE connected to MBSR UE" is used for normal end user UEs, which avails the MBSR services by registering/camping on them. Applicable time slot/timer for the CAG ID is allowed to access the CAG cell or the time slot UE is not allowed to access the CAG cell. A timer associated with the CAG ID can consists of start time and end time information or duration after the UE has accessed the CAG or any other mechanism in which control of the time can be applied on CAG ID or list of CAG IDs. For example, the time slot configured is start time and end time after the end time the timer is considered expired. Based on the timer associated with the CAG ID parameter, the UE determines if the UE can access the CAG cell or not access the CAG cell. When the time slot is allowed time slot, then the UE will access the CAG otherwise UE will not access the CAG.CAG IDs expiration information is the information of expiry of all the CAG-IDs configured in the UE.

Therefore, there is a need of a method and system to overcome or at least alleviate the afore-mentioned drawbacks.

SUMMARY

In line with development of the communication systems, there is a need for access control of UE through MBSR-UE in wireless system.

The principal object of the embodiments herein is to provide a method and a wireless network of UE access control via a MBSR-UE.

Another object of the embodiments herein is to receive, by a IAB-Donor gNB, an indication from a first MBSR-UE indicating that the first MBSR-UE is about to become unavailable to provide an emergency service to the UE in the wireless network.

Another object of the embodiments herein is to transmit, by the IAB-Donor gNB, a handover request message to the UE to perform an handover to a second MBSR-UE before the first MBSR-UE becomes unavailable in the wireless network upon receiving the indication from the first MBSR-UE.

Another object of the embodiments herein is to detect, by the IAB-Donor gNB, that the handover for the UE from the first MBSR-UE to the second MBSR-UE is completed.

Another object of the embodiments herein is to transmit, by the IAB-Donor gNB, an acknowledgement message to the first MBSR-UE to become unavailable.

The technical subjects pursued in the present disclosure may not be limited to the above mentioned technical subjects, and other technical subjects which are not mentioned may be clearly understood, through the following descriptions, by those skilled in the art to which the present disclosure pertains.

The present disclosure provides an effective and efficient method for access control of UE through MBSR-UE in wireless system. Advantageous effects obtainable from the present disclosure may not be limited to the above mentioned effects, and other effects which are not mentioned may be clearly understood, through the following descriptions, by those skilled in the art to which the present disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

5

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 3 illustrates a scenario of a UE providing an IAB-indication to a IAB-donor-CU during a RRC connection establishment and a UE behavior when a CAG broadcast is stopped or none of the CAG IDs broadcasted are part of an allowed CAG list present/configured in the UE or selected CAG IDs are no more valid/broadcasted maybe due to geographical location change of the MBSR or due to mobility of the MBSR;

FIG. 6 illustrates a scenario of the UE providing the IAB-indication to the IAB-donor-CU during the RRC connection establishment and the behavior of normal UE, MBSR UE and a network entity (e.g., AMF entity, UDM entity etc.), according to the embodiments as disclosed herein;

FIG. 10 illustrates a method, implemented by the IAB-Donor gNB, for access control of the UE through the MBSR-UE in the wireless network, according to the embodiments as disclosed herein;

Figure 1:
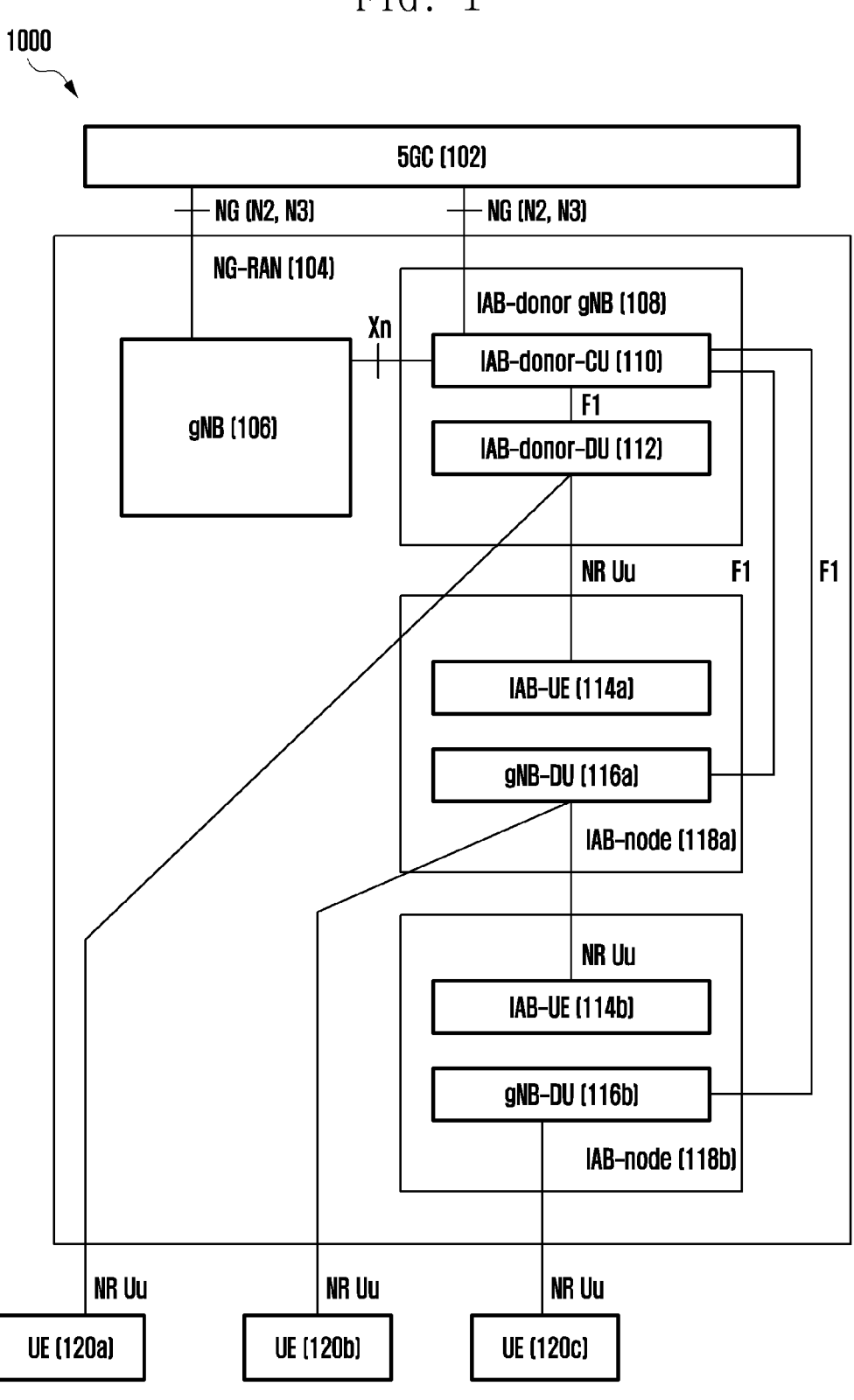
FIG. 1 illustrates a scenario of an IAB architecture.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the present disclosure. Furthermore, the one or more elements may have been represented in the drawing by conventional symbols, and the drawings may show only those specific details that are pertinent to the understanding the embodiments of the present disclosure so as not to obscure the drawing with details that will be readily apparent to those of ordinary skill in the art having benefit of the description herein.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Some of the abbreviations used in the description are as follows—

AS—Access Stratum
NAS—Non-Access Stratum
MS—Mobile Station
UE—User Equipment
ME—Mobile Equipment
MBSR—Mobile Base Station Relay
USIM—Universal Subscriber Identity Module
gNB—Next generation Node-B
gNB-DU—Next generation Node-B Distributive Unit
gNB-CU—Next generation Node-B Control Unit
SNPN—Stand-alone Non-Public Network
NR—New Radio
5GC—5G Core
NW—Network
IAB—Integrated access and backhaul
IAB-UE—The part of the IAB node that supports the Uu interface towards the IAB-donor or another parent IAB-node (and thus manages the backhaul connectivity with either PLMN or SNPN it is registered with) is referred to as an IAB-UE.
NG-RAN—Next Generation Radio Access Network
NR—New Radio
MBSR—Mobile Base Station Relay
PLMN—Public Land Mobile Network
HPLMN—Home Public Land Mobile Network
VPLMN—Visited Public Land Mobile Network
FPLMN—Forbidden Public Land Mobile Network
RPLMN—Registered Public Land Mobile Network
PLMN ID—Public Land Mobile Network Identity
UCU—UE Configuration Update
UPU—UE Policy Update
LCS—Location services
AMF—Access and Mobility Management Function
3GPP—Third Generation Partnership Project
CAG—Closed Access Group
CAG ID—Closed Access Group Identifier
UDM—Unified data management
MCS—Mission Critical Service
MPS—Mission Priority Service
RRC—Radio Resource Control
CU—Centralized Unit
DU—Distributed Unit
SNPN—Standalone Non Public Network
NPN—Non-Public Networks
RRC—radio resource control
Example list of NAS messages which is not limited to—
REGISTRATION REQUEST message;
DEREGISTRATION REQUEST message;
SERVICE REQUEST message;
CONTROL PLANE SERVICE REQUEST;
IDENTITY REQUEST;
AUTHENTICATION REQUEST;
AUTHENTICATION RESULT;
AUTHENTICATION REJECT;
REGISTRATION REJECT;
DEREGISTRATION ACCEPT;
SERVICE REJECT;
SERVICE ACCEPT;
UE CONFIGURATION UPDATE command; and
UE PARAMETERS UPDATE command.

The term 5GMM sublayer states in the embodiment are at least one of the below:
5GMM-NULL
5GMM-DEREGISTERED
5GMM-DEREGISTERED.NORMAL-SERVICE
5GMM-DEREGISTERED.LIMITED-SERVICE
5GMM-DEREGISTERED.ATTEMPTING-REGISTRA-TION
5GMM-DEREGISTERED.PLMN-SEARCH
5GMM-DEREGISTERED.NO-SUPI
5GMM-DEREGISTERED.NO-CELL-AVAILABLE
5GMM-DEREGISTERED.eCALL-INACTIVE
5GMM-DEREGISTERED.INITIAL-REGISTRATION-NEEDED
5GMM-REGISTERED-INITIATED
5GMM-REGISTERED
5GMM-REGISTERED.NORMAL-SERVICE
5GMM-REGISTERED.NON-ALLOWED-SERVICE
5GMM-REGISTERED.ATTEMPTING-REGISTRA-TION-UPDATE
5GMM-REGISTERED.LIMITED-SERVICE
5GMM-REGISTERED.PLMN-SEARCH
5GMM-REGISTERED.NO-CELL-AVAILABLE
5GMM-REGISTERED.UPDATE-NEEDED
5GMM-DEREGISTERED-INITIATED
5GMM-SERVICE-REQUEST-INITIATED
PLMN selection as per 23.122 without RPLMN—
The MS selects and attempts registration on any PLMN/access technology combinations, if available and allowable, in the following order:
  either the HPLMN (if the EHPLMN list is not present or is empty) or the highest priority EHPLMN that is available (if the EHPLMN list is present);
  each PLMN/access technology combination in the "User Controlled PLMN Selector with Access Technology" data file in the SIM (in priority order);
  each PLMN/access technology combination in the "Operator Controlled PLMN Selector with Access Technology" data file in the SIM (in priority order) or stored in the ME (in priority order);
  other PLMN/access technology combinations with received high quality signal in random order;
  other PLMN/access technology combinations in order of decreasing signal quality.
PLMN selection as per 23.122 with RPLMN:
The MS selects and attempts registration on any PLMN/access technology combinations, if available and allowable, in the following order:
  either the RPLMN or the Last registered PLMN;
  either the HPLMN (if the EHPLMN list is not present or is empty) or the highest priority EHPLMN that is available (if the EHPLMN list is present);
  each PLMN/access technology combination in the "User Controlled PLMN Selector with Access Technology" data file in the SIM (in priority order);
  each PLMN/access technology combination in the "Operator Controlled PLMN Selector with Access Technology" data file in the SIM (in priority order) or stored in the ME (in priority order);
  other PLMN/access technology combinations with received high quality signal in random order;
  other PLMN/access technology combinations in order of decreasing signal quality.
Accordingly, the embodiments herein provide a method for access control of a UE connecting through a Mobile base station relay (MBSR)-UE in a wireless network. The method includes connecting an UE to an integrated access and backhaul (IAB)-Donor gNB through a first MBSR-UE to receive an emergency service in the wireless network. Further, the method includes determining, by the IAB-Donor gNB, that the first MBSR-UE is about to become unavailable to provide the emergency service to the UE in the wireless network. Further, the method includes transmitting, by the IAB-Donor gNB, a handover request message to the UE to perform an handover procedure to move the UE to a NG-RAN node before the first MBSR-UE becomes unavailable in the wireless network upon determining that the first MBSR-UE is about to become unavailable.

Referring now to the drawings and more particularly to FIGS. 5 through 12, where similar reference characters denote corresponding features consistently throughout the figures, there are shown preferred embodiments.

FIG. 1 illustrates a scenario of IAB architecture. The IAB architecture includes a 5GC (102), a NG-RAN (104), a gNB (106), a IAB-donor gNB (108), a IAB-donor-CU (110), IAB-donor-DU (112), an IAB-UE (114a, 114b), a gNB-DU (116a, 116b), an IAB-node (118a, 118b) and UEs (120a-120b). The 5GC (102) is communicated with the NG-RAN (104) and the IAB-donor-CU (110) through a N2 interface and a N3 interface. a IAB-donor-DU (112) is communicated with the UE (120a) through a NR Uu. The gNB-DU (116a, 116b) are communicated with the UE (120a) through the NR Uu.

The IAB architecture enables wireless in-band and out-of-band relaying of NR Uu access traffic via NR Uu backhaul links. The Uu backhaul links can exist between the IAB-node (118a, 118b) and:

a gNB referred to as IAB-donor; or another IAB-node (118a, 118b).

The part of the IAB node that supports the Uu interface towards the IAB-donor or another parent IAB-node (118a, 118b) (and thus manages the backhaul connectivity with either PLMN or SNPN it is registered with) is referred to as an IAB-UE (114a, 114b). An IAB Node consists of two modules:

IAB-UE (114a, 114b) and, gNB-DU (116a, 116b).

Figure 2:
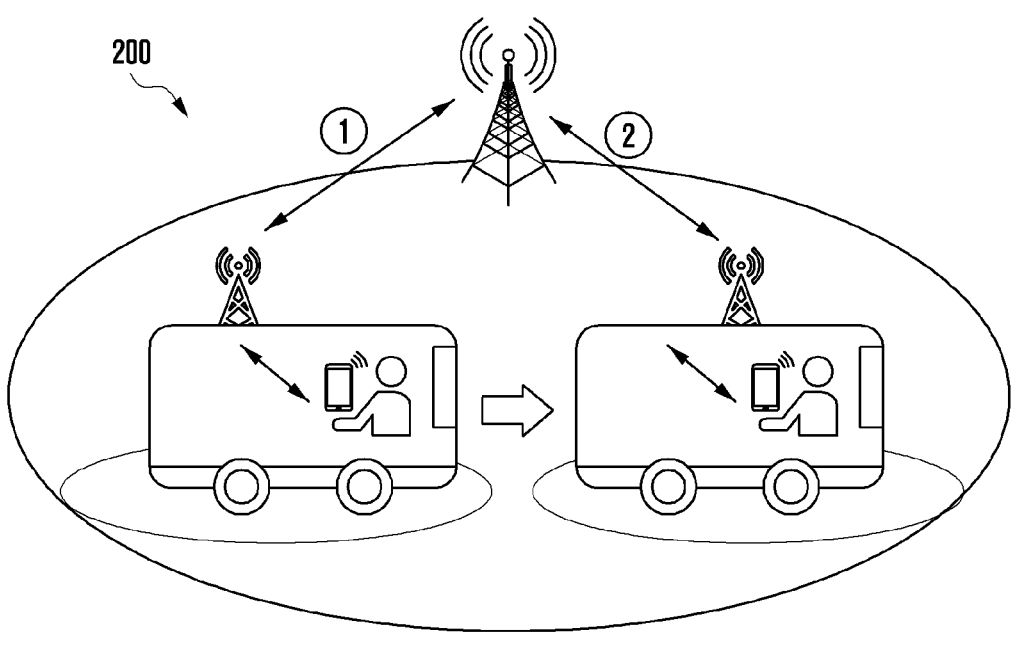
FIG. 2 illustrates a scenario of a MBSR architecture.

FIG. 2 illustrates a scenario of the MBSR architecture (200). In the MBSR architecture (200), the mobile base station relays uses the IAB architecture. Further, the mobile base station relay has a single hop to the IAB-donor node and the mobile base station relay may serve UEs located inside or outside the vehicle mounted with the relay. The NR Uu is used for the radio link between a mobile base station relay and served UEs, and between mobile base station relay and IAB-donor node. Further, the LCS framework is used for providing the location service to the served UEs. Furthermore, the mobile base station may connect to an IAB-donor node of a PLMN or an SNPN.

FIG. 3 illustrates a scenario of UE (120) provides the IAB-indication to the IAB-donor-CU (110) during the RRC connection establishment.

Referring to the FIG. 3, the UE (120) can behave as the MBSR (e.g., mobile IAB node or the like) when UE (120) provides an IAB-indication to the IAB-donor-CU (110) during the RRC connection establishment and on the basis of the subscription data for IAB operation, selected AMF (by the IAB-donor-CU) (110) performs the IAB authorization during the UE registration procedure/UE context setup procedure/modification procedure.

However, the UE (120) can behave either as a normal UE/UE (No MBSR)/UE (without mobile relay operation) or as a UE (120) (With mobile relay operation)/UE (MBSR) using the IAB authorization on the basis of subscription data of the UE (120a-120c). Hereafter, the label of the UE is 120. Also, the UE (120) can behave as a MBSR for a certain time period/time window/time slot/based on certain timer and/or only in a given geographical location/area (For example—UE (120) can behave as a Mobile Base Station Relay (MBSR) only when the UE (120) is in a geographical location/area where the UE is allowed to operate as a MBSR and the time when the UE (120) is behaving as a MBSR is within a stipulated time window or timer period when the UE (120) is allowed to operate as a MBSR).

The MBSR (i.e. mobile IAB node) cells or the cells covered/broadcasted by the MBSR can be configured with CAG identifiers and can announce/broadcast the CAG Identifiers (CAG IDs). The UE(s), that supports CAG, may select the cells covered by the MBSR on the configured CAG IDs using the existing CAG control logic.

For example, a bus/train can behave as a MBSR for a certain time-period/time slot/time-window or for a certain amount of time or for certain geographical locations and can also be configured with CAG IDs. The access to IAB-node (118a, 118b)/MBSR CAG identifier may be limited to certain time period/time slot/time window or for a certain amount of time and specific locations and granted to the user subscription data via O&M or AF.

However when the CAG broadcast is stopped or none of the CAG IDs broadcasted are part of the allowed CAG list present/configured in the UE (120) or selected CAG IDs are no more valid/broadcasted maybe due to geographical location change of the MBSR (i.e. mobile IAB node) or due to mobility of the MBSR or maybe due to the time-window/timer expiry with respect to the MBSR behavior (time-window (i.e. UE is not in the time slot of the start time and end time configured) or timer for which the UE (120) shall behave as the MBSR expired), or due to any other reason, the UE behavior, MBSR behavior or the Network Behavior (behavior of Network Entity of Network functions such as AMF, UDM etc.) is not defined in the conventional methods and systems.

As shown in FIG. 3, at S302, the MBSR is in Cell A and configured with CAG identifiers (i.e., CAG ID 1, 2). The UEs, that supports CAG ID 1 & 2 are part of allowed CAG List for UEs connected through/via MBSR), may select the cells covered by the MBSR on the configured CAG IDs using the existing CAG control logic. At S304, when the MBSR moves to Cell B (Due to Mobility), the CAG broadcast for CAG ID 1 & 2 may stop or the Cell B may broadcast new set of CAG IDs (CAG IDs 3 & 4) which are not the part of allowed CAG list for connected UEs. At S306, the cell when it was broadcasting CAG ID 1 and 2 (i.e. it was a suitable cell) suddenly becomes not a suitable cell for the UE, this is not known to UE and the UE will end up considering the current cell as suitable cell and be in NO SERVICE which is not desirable.

Figure 4:
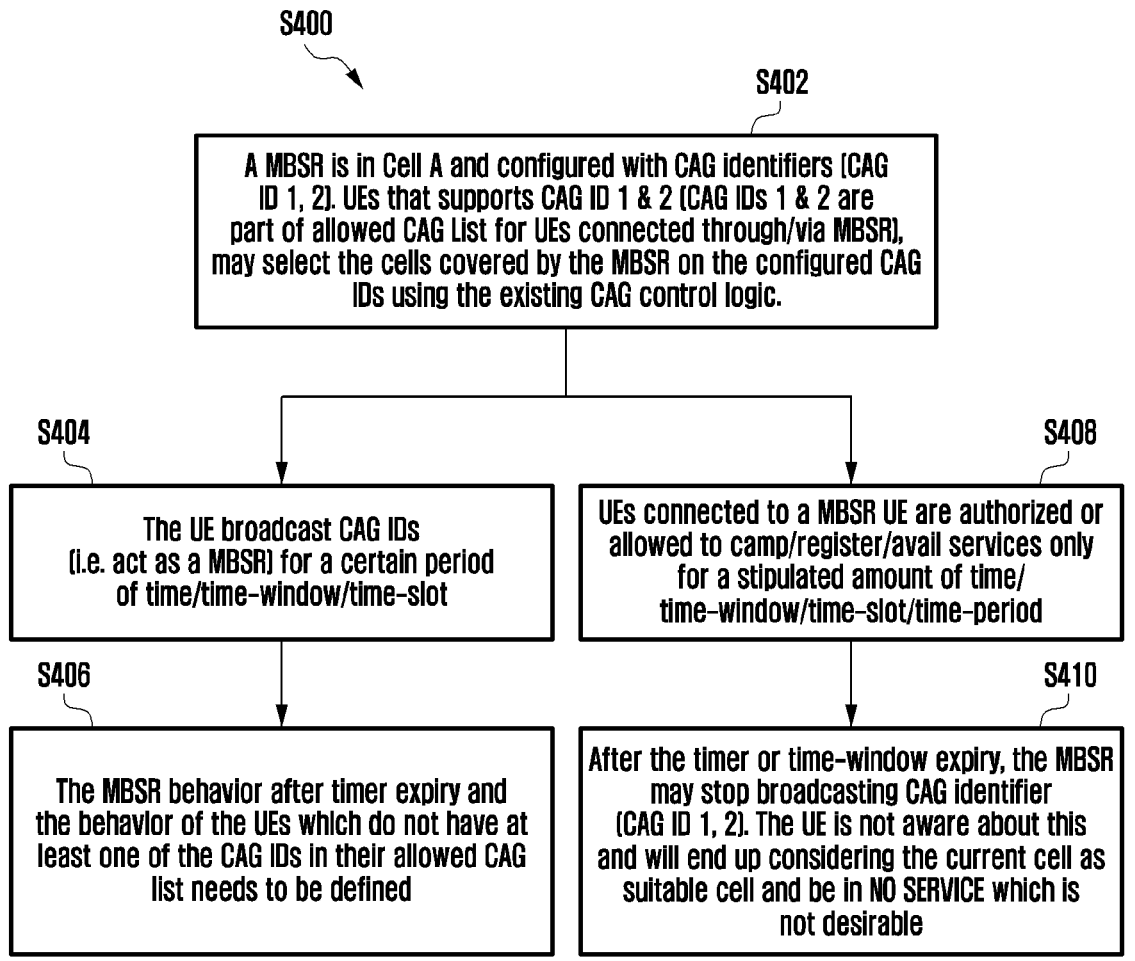
FIG. 4 illustrates another scenario of the UE providing the IAB-indication to the IAB-donor-CU during the RRC connection establishment and the UE and the MBSR UE behavior when the CAG broadcast is stopped or none of the CAG IDs broadcasted are part of the allowed CAG list present/configured in the UE or selected CAG IDs are no more valid/broadcasted maybe due to the time-window/timer expiry with respect to the MBSR behavior (time-window or timer for which the UE shall behave as a MBSR expired), or due to the expiry of certain timer/time-period/time-window/time slot for which the UEs are allowed to camp/register on the MBSR UE or due to any other reason.

FIG. 4 illustrates another scenario with the UE (120) providing the IAB-indication to the IAB-donor-CU (110) during the RRC connection establishment and the UE and the MBSR UE behavior when the CAG broadcast is stopped or none of the CAG IDs broadcasted are part of the allowed CAG list present/configured in the UE (120) or selected CAG IDs are no more valid/broadcasted maybe due to the time-window/timer expiry with respect to the MBSR behavior (time-window or timer for which the UE (120) shall behave as a MBSR (i.e. mobile IAB node) expired), or due to the expiry of certain timer/time-period/time-window/time slot for which the UEs are allowed to camp/register on the MBSR UE (1202 or due to any other reason.

As shown in FIG. 4, at S402, the MBSR is in Cell A and configured with the CAG identifiers (i.e., CAG ID 1, 2). The UEs that supports CAG ID 1 and 2 (CAG IDs 1 & 2 are part of allowed CAG List for UEs connected through/via MBSR), may select the cells covered by the MBSR on the configured CAG IDs using the existing CAG control logic. At S404, the UE (120) broadcast CAG IDs (i.e. act as a MBSR) for a certain period of time/time-window/time-slot. At S406, the MBSR behavior after timer expiry and the behavior of the UEs which do not have at least one of the CAG IDs in their allowed CAG list needs to be defined. At S408, the UEs (100) connected to the MBSR UE are authorized or allowed to camp/register/avail services only for a stipulated amount of time/time-window/time-slot/time-period. At S410, after the timer or time-window expiry, the MBSR may stop broadcasting CAG identifier (CAG ID 1, 2). The UE is not aware about this and will end up considering the current cell as suitable cell and be in NO SERVICE which is not desirable.

Thus it is desirable to solve the issue or at least provide a reasonable alternative to solve the problem.

If the broadcast information on the CAG IDs have changed and optionally, at least one of the CAG-ID broadcasted is not part of the allowed CAG list of the UE (i.e. in this embodiment this implies becomes not authorized based on the "Allowed CAG list" (e.g., time validity information no longer matches UE's current time or location validity information no longer matches UEs current location)) (120) or at least one of the CAG-ID part of the allowed CAG list of the UE (120) for the SNPN/PLMN is not broadcasted by the network (gNB or any other RAN node), then the UE (120) (UE (120) connected to MBSR UE (122)) shall perform at-least one of the below steps, in any possible combinations or order—

The UE (120) (i.e., UE connected to MBSR UE) shall trigger a registration procedure with the network on the same or any other PLMN/access technology combinations (after performing PLMN selection), if available and allowable.

The UE (120) shall enter at least one of the 5GMM sublayer states (example 5GMM-REGISTERED.LIMITED-SERVICE or 5GMM-REGISTERED. PLMN-SEARCH).

The UE (120) (i.e., UE connected to MBSR UE) shall perform cell selection or cell reselection procedure or perform the PLMN selection procedure as per "PLMN selection as per 23.122 without RPLMN" or "PLMN selection as per 23.122 with RPLMN" to select and attempt registration on the same or other PLMN/access technology combinations, if available and allowable.

The UE (120) (i.e., UE connected to MBSR UE) shall trigger deregistration procedure.

The UE (120) will start timer T3540, on expiry of timer T3540, the UE (120) will locally release the NAS signaling connection.

If the services are ongoing (i.e. NAS signaling connection is active or NAS procedures are ongoing, the UE (120) (i.e., UE connected to MBSR UE) shall release the NAS signaling connection locally immediately or optionally after the service is done or after implementation dependent timer (or the timer can be configured by network in at least one of the NAS or AS signaling message).

If the emergency services are ongoing, the UE (120) (i.e., UE connected to MBSR UE) shall release the signaling connection locally after the Emergency service is done.

The UE (120) starts a timer for each CAG (optionally per UE) or CAG list, If timer associated with CAG ID/list of CAG IDs has expired optionally, at least one of the CAG-ID broadcasted is not part of the allowed CAG list of the UE (120) or at least one of the CAG-ID part of the allowed CAG list of the UE (120) for the SNPN/PLMN is not broadcasted by the network (e.g., gNB or any other RAN node or the like), the allowed CAG list in the case is the set of CAG IDs which are considered after removing the CAG IDs for which timer is expired, i.e. CAG-ID(s) configured in the UE becomes not authorized based on the "Allowed CAG list" (e.g., time validity information no longer matches UE's current time or location validity information no longer matches UEs location); then the UE (120) (i.e., UE connected to MBSR UE) shall perform at-least one of the below steps, in any possible combinations or order—

The UE shall consider that CAG ID(s) which are expired (or not valid anymore) is not part of allowed CAG list of the UE (120). The UE (120) shall provide the new allowed CAG list to lower layers.

The UE (UE connected to MBSR UE) shall trigger a registration procedure with the network on the same or any other PLMN/access technology combinations (after performing PLMN selection), if available and allowable.

The UE (120) shall enter at least one of the 5GMM sublayer states.

The UE (120) (i.e., UE connected to MBSR UE) shall perform cell selection or cell reselection procedure or perform the PLMN selection procedure as per "PLMN selection as per 23.122 without RPLMN" or "PLMN selection as per 23.122 with RPLMN" to select and attempt registration on the same or other PLMN/access technology combinations, if available and allowable.

The UE (UE connected to MBSR UE) shall trigger Deregistration procedure.

The UE shall release the NAS signaling connection locally optionally after waiting for a specific time guided by the timer value. The timer value can be pre-configured or configured by the network in the UE (120) or the timer value can be UE implementation dependent timer.

The UE (120) will start timer T3540, on expiry of timer T3540, the UE (120) will locally release the NAS signaling connection.

If the services are ongoing, the UE (120) (i.e., UE connected to MBSR UE) shall release the signaling connection locally immediately or optionally after the service is done.

If the emergency services are ongoing, the UE (120) (i.e., UE connected to MBSR UE) shall release the signaling connection locally after the Emergency service is done.

If no CAG-ID is authorized based on the "Allowed CAG list" (e.g., time validity information no longer matches UE's current time) of the entry for the current PLMN in the stored "CAG information list" and the UE does not have an emergency PDU session, then the UE shall abort ongoing UE initiated 5GMM procedures, if any, locally release the NAS signaling connection, if any, enter the state 5GMM-REGISTERED.PLMN-SEARCH and shall apply the PLMN selection process defined in 3GPP TS 23.122 [5] with the stored "CAG information list"

If the broadcast information on the CAG IDs have changed and optionally, at least one of the CAG-ID broadcasted is not part of the allowed CAG list of the UE (120) (i.e., UE connected to MBSR UE) then MBSR UE (122) shall perform at-least one of the below steps, in any possible combinations or order—

The MBSR UE (122) shall indicate the updated CAG information (i.e. CAG ID information is changed) to the UEs (connected to the MBSR UE) via any NAS signaling message. (For example UE Configuration Update Command or UE Provisioning Update Command).

The MBSR UE (122) shall trigger Deregistration procedure.

The MBSR UE (122) shall release the NAS/RRC signaling connection locally optionally after waiting for a specific time guided by the timer value. The timer value can be pre-configured or configured in the MBSR UE (122) by the network or the timer value can be MBSR UE implementation dependent timer.

If the services are ongoing, the MBSR UE (122) shall release the signaling connection for the UE immediately or optionally after the service is done.

If the Emergency services are ongoing, the MBSR UE (122) shall release the signaling connection locally after the Emergency service is done.

If the time period/time-slot/time-window/timer for which the UE (120) behaves as the MBSR is expired (i.e. the UE (120) will behave as a Normal UE (UE Without MBSR behavior)) then the MBSR UE (122) shall perform at-least one of the below steps, in any possible combinations or order—

The MBSR UE (122) shall stop broadcasting the CAG IDs.

The MBSR UE (122) shall indicate the updated CAG information (i.e. CAG ID information is changed) to the UEs (connected to the MBSR UE) via any NAS/AS signaling message. (For example UE Configuration Update Command or UE Provisioning Update Command).

The MBSR UE (122) shall stop paging the UEs (connected to the MBSR UE).

The MBSR UE (122) shall trigger Deregistration procedure.

The MBSR UE (122) shall release the NAS/RRC signaling connection locally optionally after waiting for a specific time guided by the timer value. The timer value can be pre-configured or configured in the MBSR UE (122) by the network or the timer value can be MBSR UE implementation dependent timer.

If the services are ongoing, the MBSR UE (122) shall release the signaling connection for the UE (120) connected to MBSR immediately or optionally after the service is done.

If the Emergency services are ongoing, the MBSR UE (122) shall release the signaling connection for the UE (120) connected to MBSR after the Emergency service is done.

The network (e.g., MBSR UE (122)) starts a timer for each CAG/list of CAG IDs (optionally per UE) and If timer associated with CAG ID/list of CAG IDs has expired then the MBSR UE (122) shall perform at-least one of the below steps, in any possible combinations or order—

The MBSR UE (122) shall stop paging the UEs (connected to the MBSR UE (122)).

The MBSR UE (122) shall trigger the deregistration procedure and release the NAS signaling connection optionally after waiting for a specific time guided by the timer value. The timer value can be pre-configured or configured in the MBSR UE (122) by the network or the timer value can be MBSR UE implementation dependent timer.

If the services are ongoing, the MBSR UE (122) shall release the signaling connection locally immediately or optionally after the service is done.

If the Emergency services are ongoing, the MBSR UE (122) shall release the signaling connection locally after the Emergency service is done.

If the MBSR UE (122) determines that the MBSR UE (122) should stop acting as a MBSR and should start acting as normal UE (120) then it should take the step gracefully.

By first looking for UEs which are ongoing some emergency services or mission critical services or any services in general. The MBSR UE (122) should trigger handover procedure to handover the currently camped UEs to alternate gNB or any other RAN (eNB or NR node etc.) node.

If handover is not possible or the MBSR UE (122) determines the MBSR UE (122) cannot or will not handover the UE (120), then if emergency service is ongoing then MBSR UE (122) should continue to act as MBSR UE (122) for those UEs for which emergency service or MCS or MPS or any other critical services are ongoing and not release the NAS/RRC signaling connection. Optionally, the behavior MBSR UE (122) can continue to act on other UEs too which are not having emergency service till the emergency services on all the UEs are completed.

The IAB-donor gNB (108), determines that the MBSR UE (122) should not act as MBSR or its MBSR CAG ID/list of CAG IDs is about to expire/not valid then IAB-donor should trigger handover procedure for the UEs connected to that MBSR UE (122) so that service continuity is provided. The IAB-donor may prioritize for the UEs which are having emergency/MCS/MPS services. The handover procedure will move the UEs from the MBSR UE (122) to another MBSR UE (122*b*) or another RAN node (124) so that service continuity is possible.

If the broadcast information on the CAG IDs have changed and optionally, at least one of the CAG-ID broadcasted is not part of the allowed CAG list of the UE (120) (i.e., UE connected to MBSR UE (122)) then the network shall perform at-least one of the below steps, in any possible combinations or order—

The network shall indicate the updated CAG information (i.e. CAG ID information is changed) to the MBSR UE (122) via any NAS signaling message. (For example UE Configuration Update Command or UE Provisioning Update Command).

The network shall trigger the deregistration procedure, release the NAS signaling connection optionally after waiting for a specific time guided by the timer value. The timer value can be Network implementation dependent timer.

If the services are ongoing, Network shall release the signaling connection locally immediately or optionally after the service is done.

If the Emergency services are ongoing, Network shall release the signaling connection locally after the Emergency service is done.

If the time period/time-slot/time-window/timer/subscription for which the UE (120) behaves as the MBSR is expired (i.e. not valid in other words validity condition are not met) (i.e. UE (120) will behave as a Normal UE (UE Without MBSR behavior)) then the Network shall perform at-least one of the below steps, in any possible combinations or order—

The network shall stop configuring the CAG IDs.

The network shall indicate the updated CAG information (i.e. CAG ID information is changed) to the MBSR UE (122) via any NAS signaling message. (For example UE Configuration Update Command or UE Provisioning Update Command).

The network shall stop paging the MBSR UE (122).

The network shall trigger Deregistration procedure and release the NAS signaling connection optionally after waiting for a specific time guided by the timer value. The timer value can be pre-configured or configured in the MBSR UE (122) by the network or the timer value can be MBSR UE implementation dependent timer.

If the services are ongoing, Network shall release the signaling connection locally immediately or optionally after the service is done.

If the Emergency services are ongoing, Network shall release the signaling connection locally after the Emergency service is done.

The network starts a timer for each CAG (optionally per UE) and If timer associated with CAG ID has expired or the validation condition are not met (i.e. UE is not in the start-time and end time configuration of that CAG ID) i.e. for e.g. CAG-ID(s) configured in the UE becomes not authorized based on the "Allowed CAG list" (e.g., time validity information no longer matches UE's current time or location validity information no longer matches the location of the UE) then the network (e.g. AMF) shall perform at-least one of the below steps, in any possible combinations or order—

The network shall stop paging the MBSR UE (122).

The network shall trigger Deregistration procedure and release the NAS signaling connection optionally after waiting for a specific time guided by the timer value. The timer value can be pre-configured or configured in the MBSR UE (122) by the network or the timer value can be MBSR UE implementation dependent timer.

If the services are ongoing, Network shall release the signaling connection locally immediately or optionally after the service is done.

If the emergency services are ongoing, Network shall release the signaling connection locally after the Emergency service is done.

If time period/time-slot/time-window/timer for which the UE behaves as the MBSR is expired this means CAG-ID(s) configured in the UE becomes not authorized based on the "Allowed CAG list" (e.g., time validity information no longer matches UE's current time or location validity information no longer matches the location of the UE), in this situation UEs will do local NAS signaling connection release and perform PLMN selection/cell selection/cell reselection.

IN this embodiment the solutions are illustrated using the network as PLMN as an example but same solutions and claims are applicable when the network is SNPN.

Mobile base station relay (MBSR): the mobile base station acts as a relay between the UE (120) and the 5G network, i.e. providing a NR access link to UEs and connected wirelessly (using NR) through a IAB-donor to the 5G Core. Such mobile base station relay is assumed to be mounted on a moving vehicle and serve UEs that can be located inside or outside the vehicle (or entering/leaving the vehicle).

MBSR-UE (122): the UE (120) which behaves as a MBSR.

IAB-Donor gNB (108): The IAB-Donor gNB (108) is a NG-RAN node (104) that supports integrated access and backhaul (IAB) feature and provides connection to the core network to IAB-nodes (118a, 118b). The IAB-Donor gNB (108) supports the CU function of the CU/DU architecture for IAB defined in TS 38.401.

MBSR-AMF: An AMF serving the MBSR.

UE-AMF: An AMF serving the UE (120) (Normal UE/UE without MBSR Behavior).

CAG IDs expiration information is provided to the MBSR-UE (122), IAB-donor gNB (108), MBSR-AMF, UE-AMF. i.e. when MBSR UE (122) will cease to act as MBSR UE (122) and will behave as normal UE.

When the MBSR-UE (122) determines that the MBSR-UE (122) is about to cease acting as MBSR-UE (122) (for example due to expiry of all the CAG-IDs configured in the UE (120) or any other reasons) then the MBSR-UE (122) can indicate the same to IAB-donor gNB (108), IAB-donor gNB (108) can trigger handover procedure for the UEs connected to MBSR-UE (122), IAB-donor gNB (108) indicates (acknowledges) to the MBSR-UE (122) that it can cease to act as MBSR. Then MBSR should stop broadcasting the SIBS and act as a normal UE.

Figure 5:
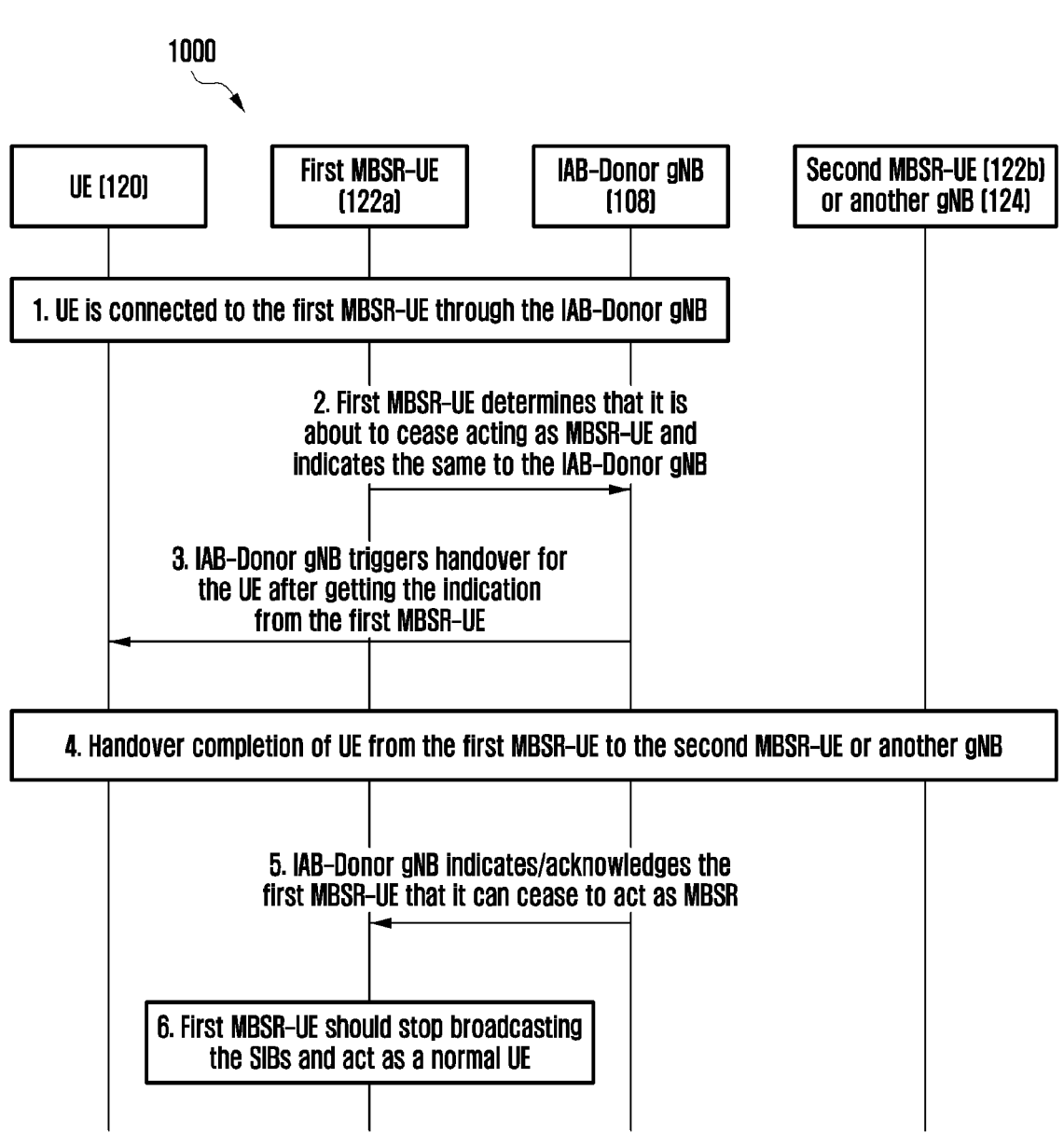
FIG. 5 illustrates a scenario of handover of normal UE, which is connected to a MBSR UE, from one MBSR UE to another MBSR UE or another gNB, according to the embodiments as disclosed herein.

FIG. 5 illustrates a scenario of normal UE (120) which is connected to MBSR UE (122), according to the embodiments as disclosed herein. The steps are as follows:

Step 1—The UE (120) is connected to the first MBSR-UE (122a) through IAB-Donor gNB (108).

Step 2—First MBSR-UE (122a) determines that the first MBSR-UE (122a) is about to cease acting as the MBSR-UE (122) and indicates the same to IAB-Donor gNB (108).

Step 3—IAB-Donor gNB (108) triggers handover for the UE (120) after getting the indication from the first MBSR-UE ((122a)).

Step 4—Handover completion of UE from the first MBSR-UE (122a) to the second MBSR-UE (122b) or another gNB (124).

Step 5—IAB-Donor gNB (108) indicates/acknowledges the first MBSR-UE (122a) that the IAB-Donor gNB (108 can cease to act as MBSR.

Step 6—The first MBSR-UE (122a) should stop broadcasting the SIBs and act as the normal UE.

FIG. 6 illustrates a scenario of the UE (120) provides the IAB-indication to the IAB-donor-CU (110) during the RRC connection establishment, according to the embodiments as disclosed herein.

When A MBSR is in Cell A and configured with CAG identifiers (CAG ID 1, 2). UEs that supports CAG ID 1 & 2 (CAG IDs 1 & 2 are part of allowed CAG List for UEs connected through/via MBSR), may select the cells covered by the MBSR on the configured CAG IDs using the existing CAG logic as defined in 3GPP TS 23.501 or 3GPP TS 24.501. For at least one of the below triggers—

When the MBSR moves to Cell B (Due to Mobility), the CAG broadcast for the CAG ID 1 & 2 may stop or the new Cell B may broadcast new set of CAG IDs (CAG IDs 3 & 4) which are not the part of allowed CAG list for connected UEs (UE connected to MBSR UE).

When the UEs (120) connected to the MBSR UE (122) are authorized or allowed to camp/register/avail services only for a stipulated amount of time/time-window/time-slot/time-period, then after the expiry of the timer or time-window, connected UEs (UE connected to MBSR UE) may not be able to select/register on the CAG IDs as they are not authorized/allowed to camp/register on the MBSR UE (122).

When the UE (120) behaves as the MBSR for the certain period of time/time-window/time-slot and after the time-period/time-slot/time-window or certain timer expiry, the UE (120) may start behaving as a normal UE then, After the timer or time-window expiry, the UEs (120) connected to the MBSR may not be able to select/register on the CAG IDs as the CAG IDs are no more valid for the MBSR.

At S602, the MBSR is in the Cell A and configured with the CAG identifiers (i.e., CAG ID 1, 2). The UEs that supports CAG ID 1 & 2 (CAG IDs 1 & 2 are part of allowed CAG List for UEs connected through/via MBSR), may select the cells covered by the MBSR on the configured CAG IDs using the existing CAG control logic. At S604, when the MBSR moves to the Cell B (due to Mobility), the CAG broadcast for CAG ID 1 & 2 may stop or the Cell B may broadcast new set of CAG IDs (CAG IDs 3 & 4) which are not the part of allowed CAG list for connected UEs. The UE broadcast CAG IDs (i.e. act as a MBSR) for a certain period of time/time-window/time-slot. The UEs connected to a MBSR UE are authorized or allowed to camp/register/avail services only for a stipulated amount of time/time-window/time-slot/time-period. At S606, the network node (e.g., the IAB-Donor gNB (108)) shall follow the steps as per FIG. 10, the MBSR UE (122) shall follow the steps as per FIG. 11, and the AMF node (126) shall follow the steps as per FIG. 12.

Figure 7:
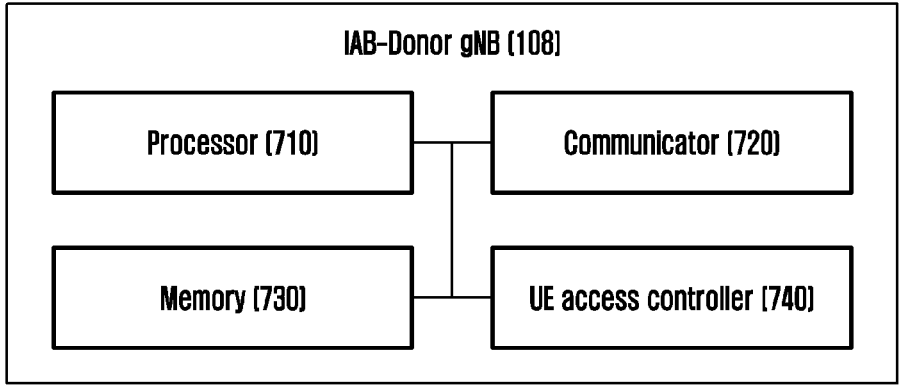
FIG. 7 illustrates various hardware components of an IAB-Donor gNB, according to the embodiments as disclosed herein.

FIG. 7 illustrates various hardware components of the IAB-Donor gNB (108), according to the embodiments as disclosed herein. In an embodiment, the IAB-Donor gNB (108) includes a processor (710), a communicator (720), a memory (730) and a UE access controller (740). The processor (710) is coupled with the communicator (720), the memory (730) and the UE access controller (740).

The UE access controller (740) connects the UE (120) through the first MBSR-UE (122a) to receive the emergency service in the wireless network (1000). Further, the UE access controller (740) determines that the first MBSR-UE (122a) is about to become unavailable to provide the emergency service to the UE (120). In an embodiment, the first MBSR-UE (122a) is unavailable when at least one of the authorization state of the first MBSR-UE (122a) changes to not authorized and the first MBSR-UE (122a) determines to stop acting as MBSR for the UE (120) due to at least one of a mobility of the first MBSR-UE (122a), expiry of a time period or timer for which the first MBSR-UE (122a) behaves as a MBSR, subscription of MBSR-UE is expired to act as MBSR, and location does not allow MBSR-UE to act as MBSR. Upon determining that the first MBSR-UE (122a) is about to become unavailable, the UE access controller (740) transmits the handover request message to the UE (120) to perform the handover procedure to move the UE (120) to the NG-RAN node (104) before the first MBSR-UE (122a) becomes unavailable in the wireless network (1000). The NG-RAN node can be, for example, but not limited to the second MBSR-UE (122b), the new gNB and the IAB-DU node (122). In an embodiment, the UE access controller (740) determines that the MBSR-UE (122) stops to act as the MBSR based on information received from the AMF entity (126).

The UE access controller (740) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (710) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (730).

Further, the processor (710) is configured to execute instructions stored in the memory (730) and to perform various processes. The memory (730) includes information about the plurality of MBSR-UEs and the plurality of IAB-Donor gNBs (108). The communicator (720) is configured for communicating internally between internal hardware components and with external devices via one or more networks. The memory (730) also stores instructions to be executed by the processor (710). The memory (730) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (730) may, in some examples, be considered a non-transitory storage medium. The term "non-transitory" may indicate that the storage medium is not embodied in a carrier wave or a propagated signal. However, the term "non-transitory" should not be interpreted that the memory (730) is non-movable. In certain examples, a non-transitory storage medium may store data that can, over time, change (e.g., in Random Access Memory (RAM) or cache).

Although the FIG. 7 shows various hardware components of the IAB-Donor gNB (108) but it is to be understood that other embodiments are not limited thereon. In other embodiments, the IAB-Donor gNB (108) may include less or more number of components. Further, the labels or names of the components are used only for illustrative purpose and does not limit the scope of the present disclosure. One or more components can be combined together to perform same or substantially similar function in the IAB-Donor gNB (108).

Figure 8:
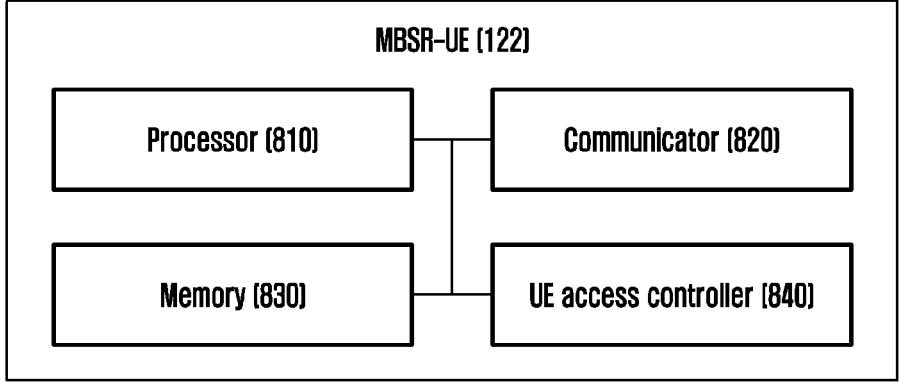
FIG. 8 illustrates various hardware components of a MBSR-UE, according to the embodiments as disclosed herein.

FIG. 8 illustrates various hardware components of the MBSR-UE (122), according to the embodiments as disclosed herein. In an embodiment, the MBSR-UE (122) includes a processor (810), a communicator (820), a memory (830) and a UE access controller (840). The processor (810) is coupled with the communicator (820), the memory (830) and the UE access controller (840).

The UE access controller (840) registers to the AMF entity (126) and starts to act as MBSR on determining that the UE (120) is allowed to act as the MBSR.

The UE access controller (840) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (810) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (810) may include multiple cores and is configured to execute the instructions stored in the memory (830).

Further, the processor (810) is configured to execute instructions stored in the memory (830) and to perform various processes. The communicator (820) is configured for communicating internally between internal hardware components and with external devices via one or more networks. The memory (830) also stores instructions to be executed by the processor (810). The memory (830) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (830) may, in some examples, be considered a non-transitory storage medium. The term "non-transitory" may indicate that the storage medium is not embodied in a carrier wave or a propagated signal. However, the term "non-transitory" should not be interpreted that the memory (830) is non-movable. In certain examples, a non-transitory storage medium may store data that can, over time, change (e.g., in Random Access Memory (RAM) or cache).

Although the FIG. 8 shows various hardware components of the MBSR-UE (122) but it is to be understood that other embodiments are not limited thereon. In other embodiments, the MBSR-UE (122) may include less or more number of components. Further, the labels or names of the components are used only for illustrative purpose and does not limit the scope of the present disclosure. One or more components can be combined together to perform same or substantially similar function in the MBSR-UE (122).

Figure 9:
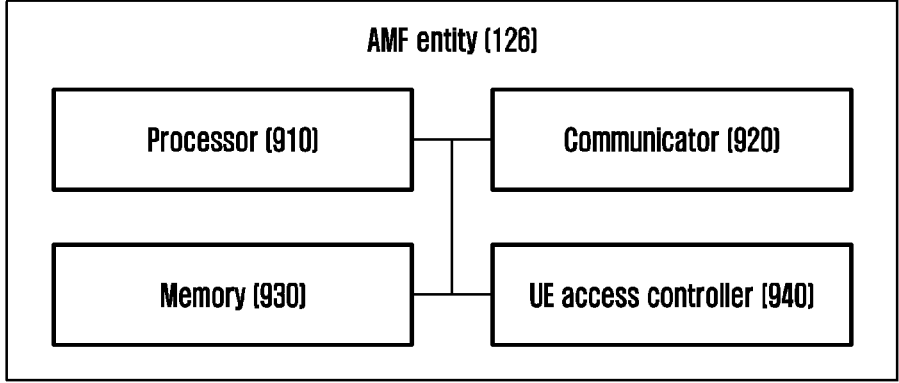
FIG. 9 illustrates various hardware components of an AMF entity, according to the embodiments as disclosed herein.

FIG. 9 illustrates various hardware components of the AMF entity (126), according to the embodiments as disclosed herein. In an embodiment, the AMF entity (126) includes a processor (910), a communicator (920), a memory (930) and a UE access controller (940). The processor (910) is coupled with the communicator (920), the memory (930) and the UE access controller (940).

The UE access controller (940) determines that the MBSR authorization state has changed for the registered MBSR node from authorized to not authorized. Further, the UE access controller (940) sends the authorization status as not authorized for the MBSR to the NG-RAN. Further, the UE access controller (940) sends the deregistration request message and release the NAS signalling connection of the MBSR-UE (122) after the predefined time. The predefined time is governed by a timer configured locally at the AMF entity (126).

The UE access controller (940) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (910) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (910) may include multiple cores and is configured to execute the instructions stored in the memory (930).

Further, the processor (910) is configured to execute instructions stored in the memory (930) and to perform various processes. The communicator (920) is configured for communicating internally between internal hardware components and with external devices via one or more networks. The memory (930) also stores instructions to be executed by the processor (910). The memory (930) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (930) may, in some examples, be considered a non-transitory storage medium. The term "non-transitory" may indicate that the storage medium is not embodied in a carrier wave or a propagated signal. However, the term "non-transitory" should not be interpreted that the memory (930) is non-movable. In certain examples, a non-transitory storage medium may store data that can, over time, change (e.g., in Random Access Memory (RAM) or cache).

Although the FIG. 9 shows various hardware components of the AMF entity (126) but it is to be understood that other embodiments are not limited thereon. In other embodiments, the AMF entity (126) may include less or more number of components. Further, the labels or names of the components are used only for illustrative purpose and does not limit the scope of the present disclosure. One or more components can be combined together to perform same or substantially similar function in the AMF entity (126).

FIG. 10 illustrates a method (S1000), implemented by the IAB-Donor gNB (108), for access control of the UE (120) through the MBSR-UE (122) in the wireless network (1000), according to the embodiments as disclosed herein. The operations (S1002-S1006) are handled by the UE access controller (740).

At S1002, the method includes connecting the UE (120) through the first MBSR-UE (122a) to receive the emergency service in the wireless network (1000). At S1004, the method includes determining by the IAB-Donor gNB, that the first MBSR-UE (122a) is about to become unavailable to provide the emergency service to the UE (120) in the wireless network (1000). At S1006, the method includes transmitting the handover request message to the UE (120) to perform the handover procedure to move the UE (120) to the NG-RAN node (104) before the first MBSR-UE (122a) becomes unavailable in the wireless network (1000) upon determining that the first MBSR-UE (122a) is about to become unavailable.

Figure 11:
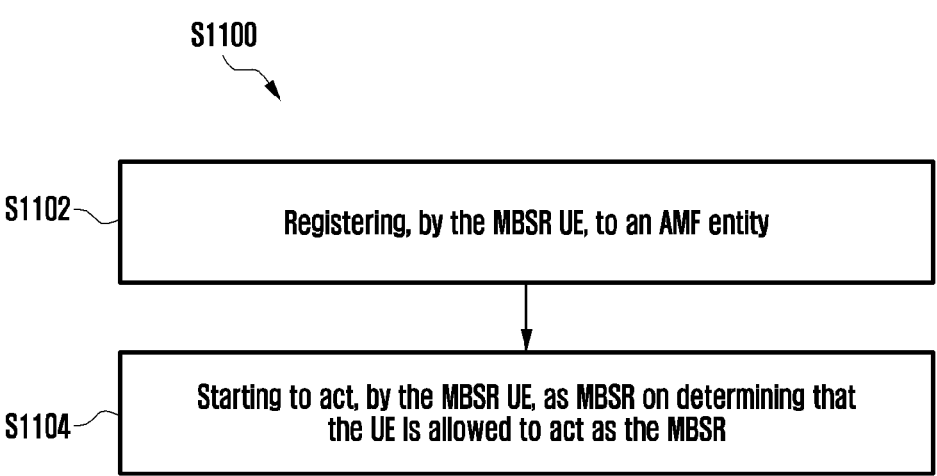
FIG. 11 illustrates a method, implemented by the MBSR-UE, for access control of the UE through the MBSR-UE in the wireless network, according to the embodiments as disclosed herein.

FIG. 11 illustrates a method (S1100), implemented by the MBSR-UE (122), for access control of the UE (120) through the MBSR-UE (122) in the wireless network (1000), according to the embodiments as disclosed herein. The operations (S1102-S1104) are handled by the UE access controller (840).

At S1102, the method includes registering to the AMF entity (126). At S1104, the method includes starting to act as MBSR on determining that the UE (120) is allowed to act as the MBSR.

Figure 12:
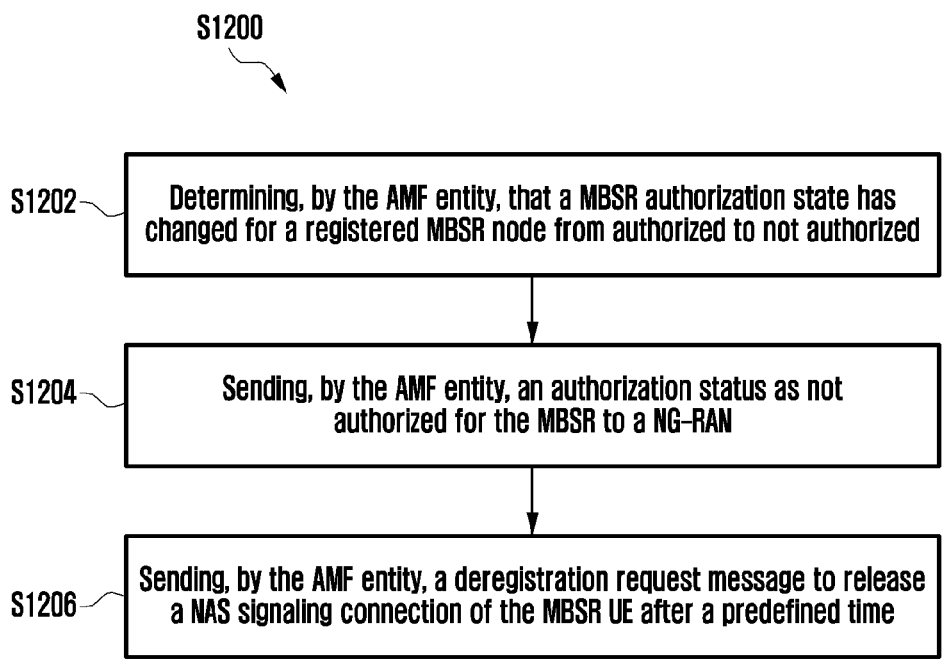
FIG. 12 illustrates a method, implemented by the AMF entity, for access control of the UE through the MBSR-UE in the wireless network, according to the embodiments as disclosed herein.

FIG. 12 illustrates a method (S1200), implemented by the AMF entity (126), for access control of the UE (120) through the MBSR-UE (122) in the wireless network (1000), according to the embodiments as disclosed herein. The operations (S1202-S1206) are handled by the UE access controller (940).

At S1202, the method includes determining that the MBSR authorization state has changed for the registered MBSR node from authorized to not authorized. At S1204, the method includes sending the authorization status as not authorized for the MBSR to the NG-RAN (104). At S1206, the method includes sending the deregistration request message after the predefined time and to release the NAS signalling connection of the MBSR-UE (122). The predefined time is governed by the timer configured locally at the AMF entity (126).

The various actions, acts, blocks, steps, or the like in the flow charts (S300, S400, S600, and S1000-S1200) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an integrated access and backhaul (IAB) donor node in a communication system, the method comprising:
   receiving, from a mobile base station relay (MBSR), information indicating the MBSR is about to become unavailable to provide services;
   identifying that the MBSR is about to become unavailable to provide the services; and
   if the MBSR is about to become unavailable to provide the services when a user equipment (UE) is accessing an emergency service and being served by the MBSR, triggering a handover procedure.

2. The method of claim 1,
   wherein the MBSR operates as an IAB node.

3. The method of claim 1, further comprising:
   identifying that a closed access group (CAG) identifier (ID) is expired or a timer is expired.

4. The method of claim 1,
   wherein the handover procedure is to handover a currently camped UE to another MBSR or another radio access network (RAN) node.

5. A method performed by a mobile base station relay (MBSR) in a communication system, the method comprising:
   identifying that the MBSR is about to become unavailable to provide services; and
   transmitting, to an integrated access and backhaul (IAB) donor node, information indicating the MBSR is about to become unavailable to provide the services,
   wherein, if the MBSR is about to become unavailable to provide the services when a user equipment (UE) is accessing an emergency service and being served by the MBSR, a handover procedure is performed.

6. The method of claim 5,
   wherein the MBSR operates as an IAB node.

7. The method of claim 5, further comprising:
   identifying that a closed access group (CAG) identifier (ID) is expired or a timer is expired.

8. The method of claim 5,
   wherein the handover procedure is to handover a currently camped UE to another MBSR or another radio access network (RAN) node.

9. An integrated access and backhaul (IAB) donor node in a communication system, the IAB donor node comprising:
   a transceiver; and
   at least one processor coupled with the transceiver and configured to:
   receive, from a mobile base station relay (MBSR), information indicating the MBSR is about to become unavailable to provide services,
   identify that the MBSR is about to become unavailable to provide the services, and
   if the MBSR is about to become unavailable to provide the services when a user equipment (UE) is accessing an emergency service and being served by the MBSR, trigger a handover procedure.

10. The IAB donor node of claim 9,
    wherein the MBSR operates as an IAB node.

11. The LAB donor node of claim 9, wherein the at least one processor is further configured to:
    identify that a closed access group (CAG) identifier (ID) is expired or a timer is expired.

12. The IAB donor node of claim 9,
    wherein the handover procedure is to handover a currently camped UE to another MBSR or another radio access network (RAN) node.

13. A mobile base station relay (MBSR) in a communication system, the MBSR comprising:
    a transceiver; and
    at least one processor coupled with the transceiver and configured to:
    identify that the MBSR is about to become unavailable to provide services, and
    transmit, to an integrated access and backhaul (IAB) donor node, information indicating the MBSR is about to become unavailable to provide the services,
    wherein, if the MBSR is about to become unavailable to provide the services when a user equipment (UE) is accessing an emergency service and being served by the MBSR, a handover procedure is performed.

14. The MBSR of claim 13, wherein the at least one processor is further configured to:
    identify that a closed access group (CAG) identifier (ID) is expired or a timer is expired,
    wherein the MBSR operates as an IAB node.

15. The MBSR of claim 13,
    wherein the handover procedure is to handover a currently camped UE to another MBSR or another radio access network (RAN) node.

* * * * *